United States Patent
Lee (10) Patent No.: US 9,203,069 B2
(45) Date of Patent: Dec. 1, 2015

(54) SECONDARY BATTERY

(75) Inventor: Jae Myoung Lee, Daejeon (KR)

(73) Assignee: SK INNOVATION CO., LTD. (KR)

( * ) Notice: Subject to any disclaimer, the term of this patent is extended or adjusted under 35 U.S.C. 154(b) by 46 days.

(21) Appl. No.: 14/232,357

(22) PCT Filed: Jun. 7, 2012

(86) PCT No.: PCT/KR2012/004457
§ 371 (c)(1),
(2), (4) Date: Jan. 13, 2014

(87) PCT Pub. No.: WO2013/024963
PCT Pub. Date: Feb. 21, 2013

(65) Prior Publication Data
US 2014/0147712 A1    May 29, 2014

(30) Foreign Application Priority Data
Aug. 17, 2011  (KR) .................. 10-2011-0081442

(51) Int. Cl.
| | |
|---|---|
| *H01M 2/12* | (2006.01) |
| *H01M 2/02* | (2006.01) |
| *H01M 2/34* | (2006.01) |
| *H01M 10/04* | (2006.01) |

(52) U.S. Cl.
CPC .......... *H01M 2/1282* (2013.01); *H01M 2/0212* (2013.01); *H01M 2/0275* (2013.01); *H01M 2/34* (2013.01); *H01M 10/0436* (2013.01)

(58) Field of Classification Search
None
See application file for complete search history.

(56) References Cited

U.S. PATENT DOCUMENTS

| | | |
|---|---|---|
| 5,523,178 A | 6/1996 | Murakami et al. |
| 2009/0130543 A1* | 5/2009 | Tatebayashi et al. ........... 429/62 |
| 2012/0003517 A1* | 1/2012 | Choi et al. .................... 429/62 |

FOREIGN PATENT DOCUMENTS

| | | |
|---|---|---|
| JP | 06290812 | 10/1994 |
| JP | 2002124224 | 4/2002 |
| KR | 1020080015164 | 2/2008 |
| KR | 1020080039091 | 5/2008 |
| KR | 100864694 | 10/2008 |

OTHER PUBLICATIONS

International Search Report—PCT/KR2012/004457 dated Jan. 2, 2013.

* cited by examiner

*Primary Examiner* — Gregg Cantelmo
(74) *Attorney, Agent, or Firm* — Cantor Colburn LLP (57) ABSTRACT

Provided is a secondary battery including a battery cell having a cathode tab and an anode tab formed at one side thereof; a pouch formed so as to be enclose and seal the battery cell so that the cathode tab and the anode tab of the battery cell are protruded to the outside; and a shape memory alloy provided in the pouch and having a bent part bent in a specific shape and penetrating through and opening the pouch while being unbent at the time of an increase in a temperature of the battery cell, to discharge gas generated in the pouch when the gas is generated in the pouch due to an increase in a temperature caused by overcharging, overdischarging, and the like, to expand the pouch, thereby making it possible to prevent ignition and explosion.

5 Claims, 6 Drawing Sheets

FIG. 1

*Prior Art*

SECONDARY BATTERY

TECHNICAL FIELD

The present invention relates to a secondary battery, and more particularly, to a secondary battery including a battery cell having a cathode tab and an anode tab formed at one side thereof; a pouch formed so as to be enclose and seal the battery cell so that the cathode tab and the anode tab of the battery cell are protruded to the outside; and a shape memory alloy provided in the pouch and having a bent part bent in a specific shape and penetrating through and opening the pouch while being unbent at the time of an increase in a temperature of the battery cell to discharge gas generated in the pouch when the gas is generated in the pouch due to an increase in a temperature caused by overcharging, overdischarging, and the like, to expand the pouch thereby making it possible to prevent ignition and explosion.

BACKGROUND ART

Generally, since a secondary battery may be charged and discharged unlike a primary battery, the secondary battery has been applied to various fields such as a cellular phone, a digital camera, a laptop computer, and a hybrid vehicle and has been actively studied. An example of the secondary battery includes a nickel-cadmium battery, a nickel-metal hydride battery, a nickel-hydrogen battery, and a lithium secondary battery.

Among these secondary batteries, the lithium secondary battery having high energy density and discharging voltage has been mainly conducted and has been commercialized and widely used.

The lithium secondary battery may be manufactured in various types. As a typical type of the lithium secondary battery, there are a cylinder type and a prismatic type that may be mainly used for a lithium ion battery. A lithium polymer battery that has been recently spotlighted is manufactured in a pouch type having flexibility, such that a shape thereof is comparatively free.

Since this pouch type lithium polymer battery (hereinafter, referred to as a "pouch type cell") may be easily bent or flexed, it has a firm case coupled to an outer side thereof, such that it may be used for a long period of time.

In addition, a pouch type cell according to the related art is manufactured so as to have an organic solvent and a plasticizer added thereto in order to improve output and capacity characteristics.

The pouch type cell according to the related art is electrochemically stable at an operation voltage (2.5 to 4.3 V) of the cell; however, materials composing the cell are decomposed at their decomposition voltages to generate ignitable gas, when a voltage of the cell increases to the operation voltage or more.

The gas generated as described above increases pressure in the pouch, such that the voltage continuously increases. In this situation, in the case in which a finely short-circuited portion exists or a lithium metal electrodeposited on a surface of an anode penetrates through a separator and then contacts a cathode, a short circuit is generated, such that a large amount of current flows, thereby instantaneously increasing a temperature in the cell and generating a large amount of gas. As a result, a swelling phenomenon that the pouch is swelled occurs.

Therefore, the ignitable gas is discharged to the outside through a weak portion of the pouch, such that the pouch type cell is ignited or exploded.

Figure 1:
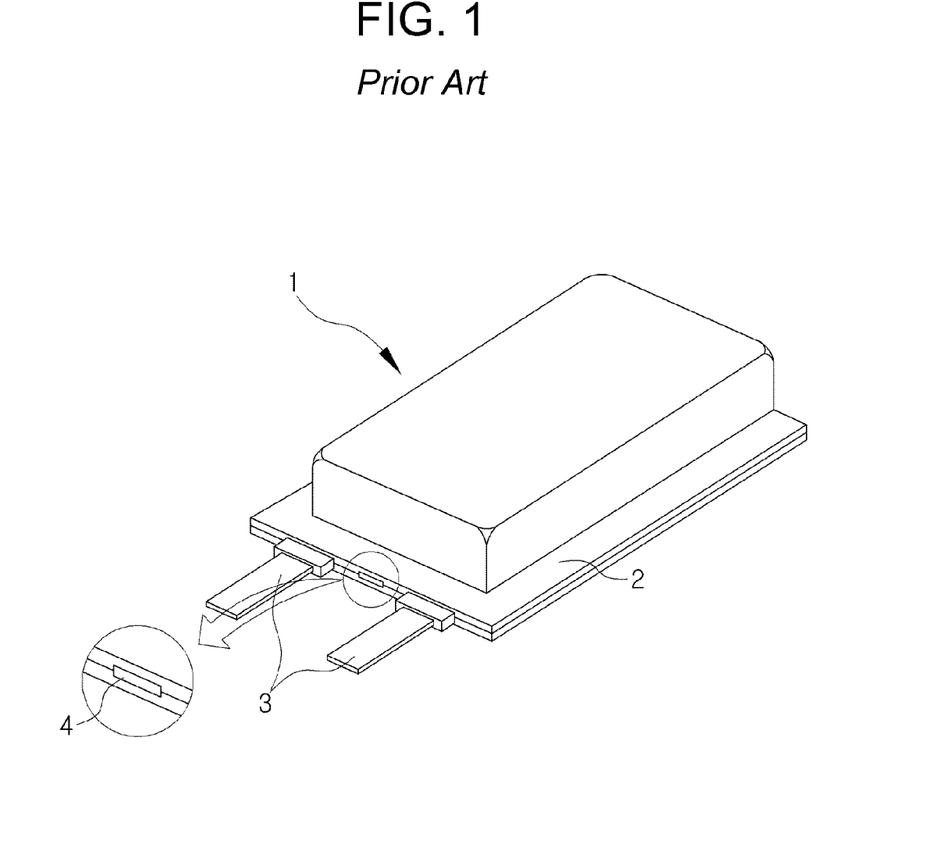
FIG. 1 is a perspective view showing a pouch type secondary battery according to the related art.

In order to prevent this problem, the pouch type cell 1 according to the related art includes an electrode body having an electrode terminal 3 formed at one side thereof and a pouch 2 sealing the electrode body, wherein the pouch 2 is formed to enclose the electrode body, is sealed by welding the vicinity thereof, and has a shape memory safety tube 4 formed at one side thereof that is sealed, as shown in FIG. 1.

Therefore, in the pouch type cell 1 according to the related art, when the gas is generated due to overcharging or a short-circuit of the electrode body, a temperature increases to open the shape memory safety tube 4, such that the gas generated in the pouch 2 is discharged to the outside, thereby preventing ignition and explosion.

However, in the pouch type cell according to the related art as described above, since the shape memory safety tube formed in the pouch should be sealed by heat fusion, or the like, it is difficult to manufacture the pouch type cell.

In addition, when the gas is generated in the pouch due to an increase in a temperature, the pouch is swelled, such that the electrode body and the pouch are not closely adhered to each other. Therefore, heat is not certainly transferred to the shape memory safety tube, such that it is difficult to open the pouch at an accurate temperature to discharge the gas.

RELATED ART DOCUMENT

Patent Document

KR 10-0864694 B1 (Oct. 15, 2008)

DISCLOSURE OF INVENTION

Technical Problem

An object of the present invention is to provide a secondary battery including a battery cell having a cathode tab and an anode tab formed at one side thereof; a pouch formed so as to be enclose and seal the battery cell so that the cathode tab and the anode tab of the battery cell are protruded to the outside; and a shape memory alloy provided in the pouch and having a bent part bent in a specific shape and penetrating through and opening the pouch while being unbent at the time of an increase in a temperature of the battery cell to discharge gas generated in the pouch when the gas is generated in the pouch due to an increase in a temperature caused by overcharging, overdischarging, and the like, to expand the pouch, thereby making it possible to prevent ignition and explosion.

Solution to Problem

In one general aspect, a secondary battery includes: a battery cell having a cathode tab and an anode tab protrudedly formed at one side thereof; a pouch enclosing and sealing the battery cell so that the cathode tab and the anode tab of the battery cell are exposed to the outside; and a shape memory alloy provided in the pouch and having a shape in which it is partially bent, wherein the shape memory alloy has a bent part penetrating through and opening the pouch while being unbent when a temperature of the battery cell increases to a specific temperature or more.

The pouch may be made of an aluminum laminate packing material.

The shape memory alloy may have a shape in which it is bent and folded in multiple stages.

The shape memory alloy may be a Ti+Ni alloy or a Cu+Zn+Al alloy.

The shape memory alloy may be positioned at an internal edge at which the pouch is sealed.

Advantageous Effects of Invention

As set forth above, since the secondary battery according to the exemplary embodiment of the present invention includes the bent shape memory alloy provided in the pouch, when the gas is generated in the pouch due to an increase in a temperature caused by overcharging, overdischarging, and the like, to expand the pouch, the bent part may penetrate through and open the pouch while being unbent. Therefore, the secondary battery according to the exemplary embodiment of the present invention may have a simple structure and be easily manufactured.

In addition, since the shape memory alloy provided in the pouch and having the bent shape is coupled to one side of the battery cell, even though the gas is generated to expand the pouch, the shape memory alloy and the battery cell contact each other to certainly transfer heat. Therefore, the pouch may be opened at an accurate temperature to discharge the gas.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

1000: Secondary Battery (according to the present invention)
100: Battery Cell
110: Cathode Tab 120: Anode Tab
130: Electrode Body
200: Pouch
300: Shape Memory Alloy 310: Bent Part

BEST MODE FOR CARRYING OUT THE INVENTION

Hereinafter, a secondary battery according to an exemplary embodiment of the present invention as described above will be described in detail with reference to the accompanying drawings.

Figure 2:
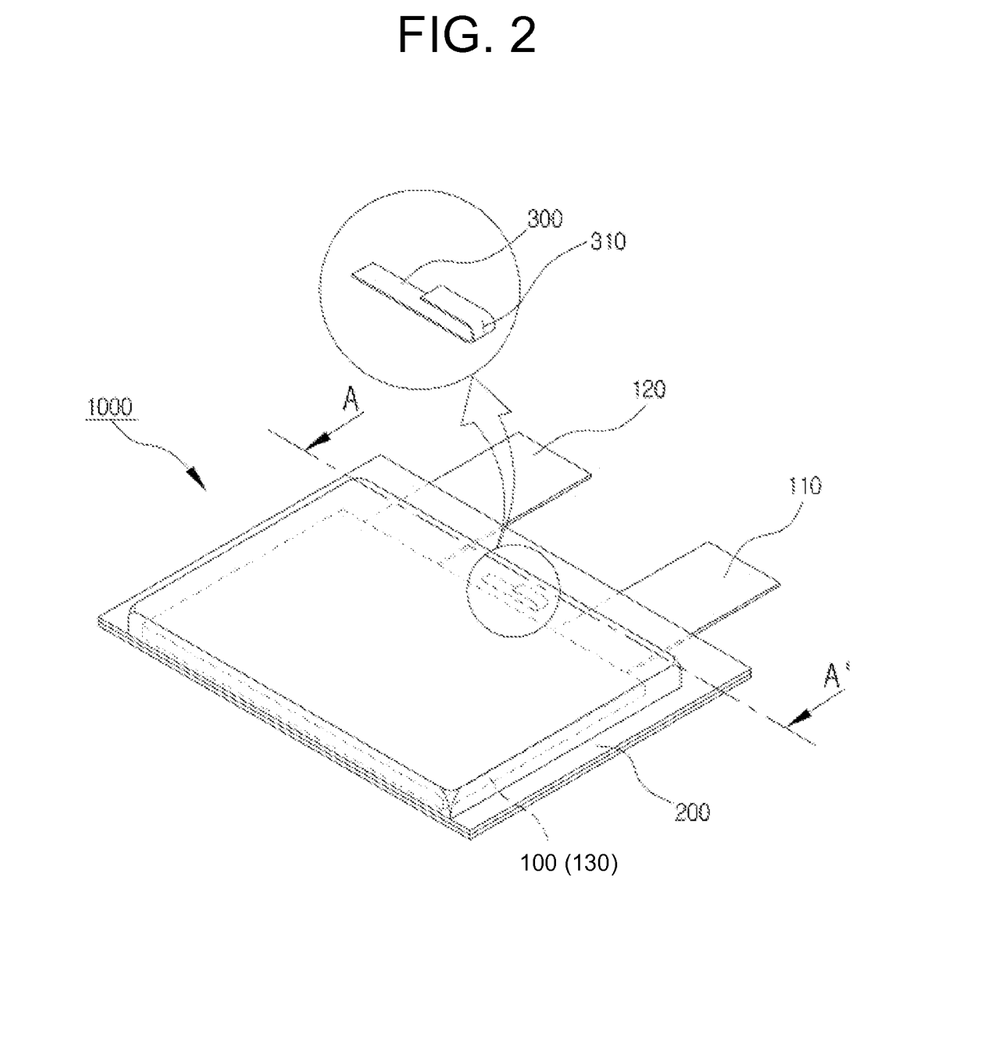
FIG. 2 is a perspective view showing a secondary battery according to an exemplary embodiment of the present invention.

FIG. 2 is a perspective view showing a secondary battery according to an exemplary embodiment of the present invention.

As shown, the secondary battery 1000 according to the exemplary embodiment of the present invention is configured to include: a battery cell 100 having a cathode tab 110 and an anode tab 120 protrudedly formed at one side thereof; a pouch 200 enclosing and sealing the battery cell 100 so that the cathode tab 110 and the anode tab 120 of the battery cell 100 are exposed to the outside; and a shape memory alloy 300 provided in the pouch 200 and having a shape in which it is partially bent.

First, the battery cell 100, which may be charged with electricity or discharge the electricity therefrom, has the cathode tab 110 and the anode tab 120 protrudedly formed at one side thereof so as to be connected to a cathode plate and an anode plate of an electrode body 130 including the cathode plate, the anode plate, a separator, an electrolyte, and the like.

In addition, the battery cell 100 is formed in a shape in which an outer surface thereof is enclosed by the pouch 200, so as to be sealed by the pouch 200.

Here, the pouch 200 is formed so that the cathode tab 100 and the anode tab 120 extendedly formed at one side of the electrode body 130 are exposed to the outside of the pouch 200.

That is, the battery cell 100 has a shape in which the cathode tab 110 and the anode tab 120 is extendedly formed at one side of the electrode body 130 and the pouch 200 seals only the electrode body 130 except for the cathode tab 110 and the anode tab 120.

In addition, the pouch 200 is formed so as to seal the electrode body 130. More specifically, the pouch 200 may be sealed by being heat fused at an edge thereof in a state in which the battery cell 100 is put in the pouch 200.

Here, the shape memory alloy 300 is provided in the pouch 200, and provided between the cathode tab 110 and the anode tab 120 at one side of the electrode body 130 of the battery cell 100, and is coupled to the pouch 200 so as to contact both surfaces of the pouch 200.

Figure 3:
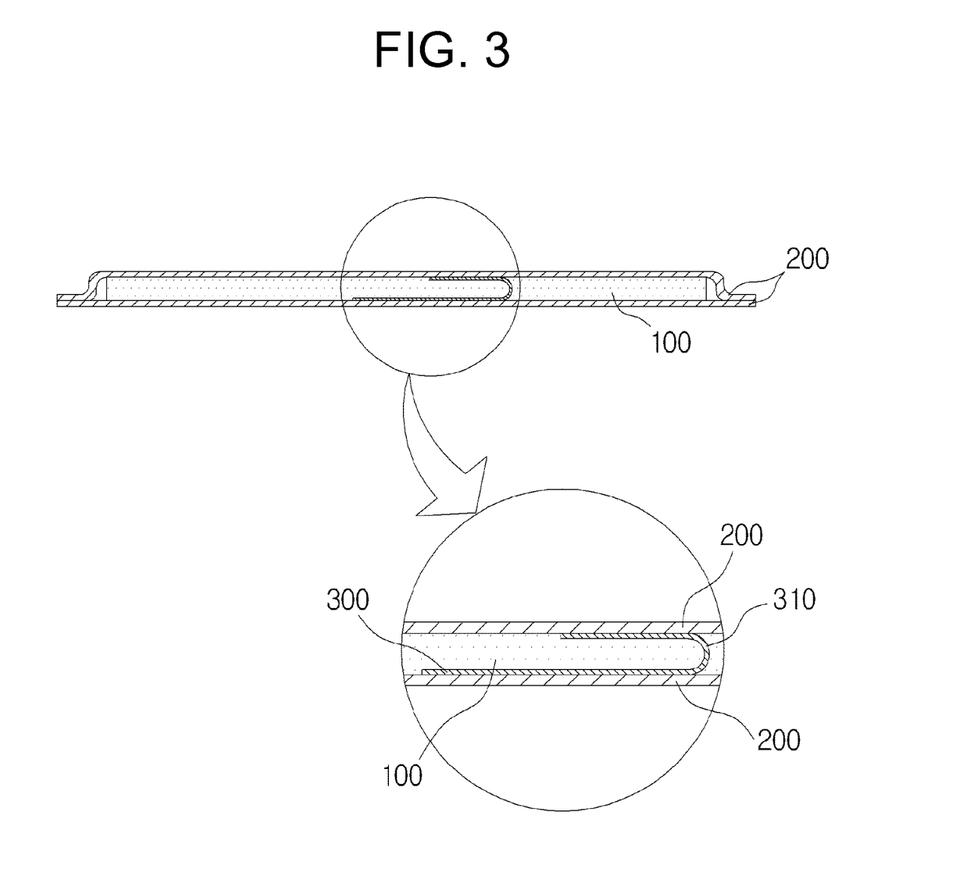
FIG. 3 is a cross-sectional view taken along the line A-A of FIG. 2.
Figure 4:
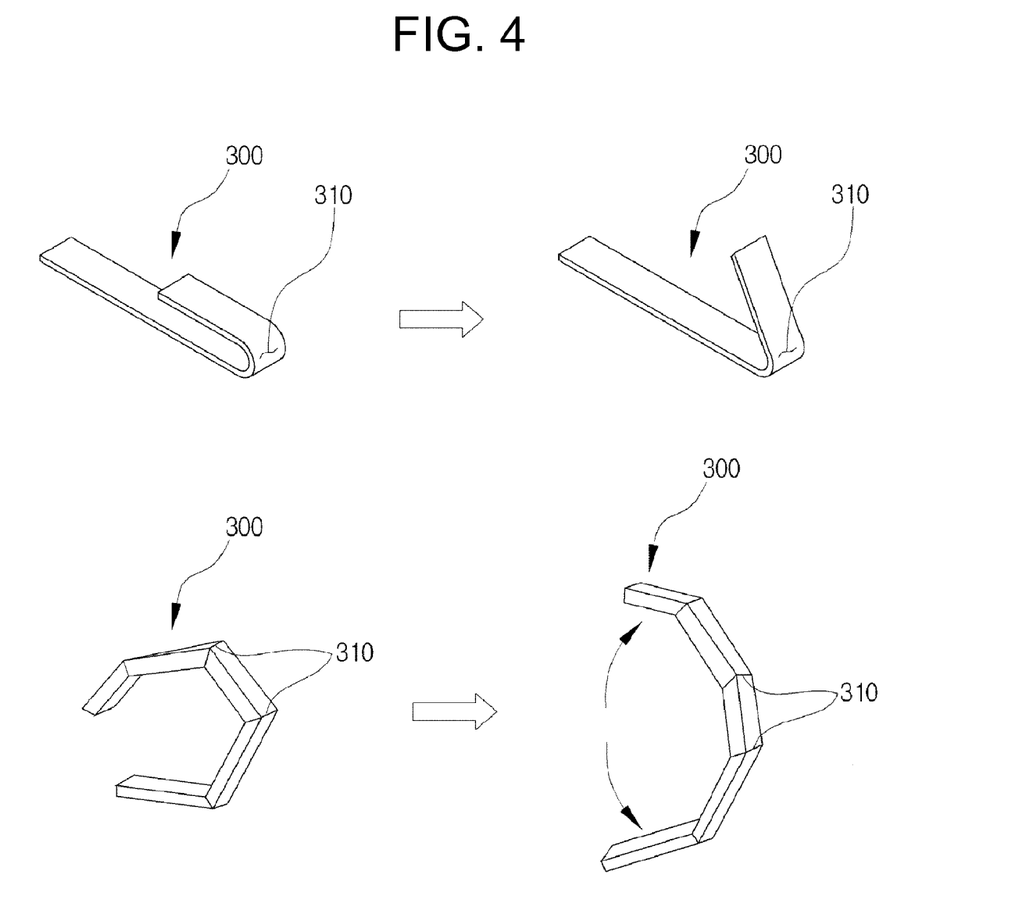
FIG. 4 is a perspective view showing an example of a shape memory alloy according to the exemplary embodiment of the present invention.

Referring to FIGS. 2 to 4, the shape memory alloy 300 is formed in a plate shape in which it has a narrow width and a long length, is partially bent, and is formed so that one side thereof having a long length contacts one surface of the pouch 200 and the other side thereof having a short length contacts the other surface of the pouch 200.

Therefore, the shape memory alloy 300 is provided in the pouch 200 and is provided at one side of the electrode body 130, thereby making it possible to make the entire thickness of the battery cell 100 thin.

Here, the shape memory alloy 300 is formed so that the bent part 310 penetrates through and opens the pouch 200 while being unbent when a temperature of the battery cell 100 increases to a specific temperature or more.

Figure 5:
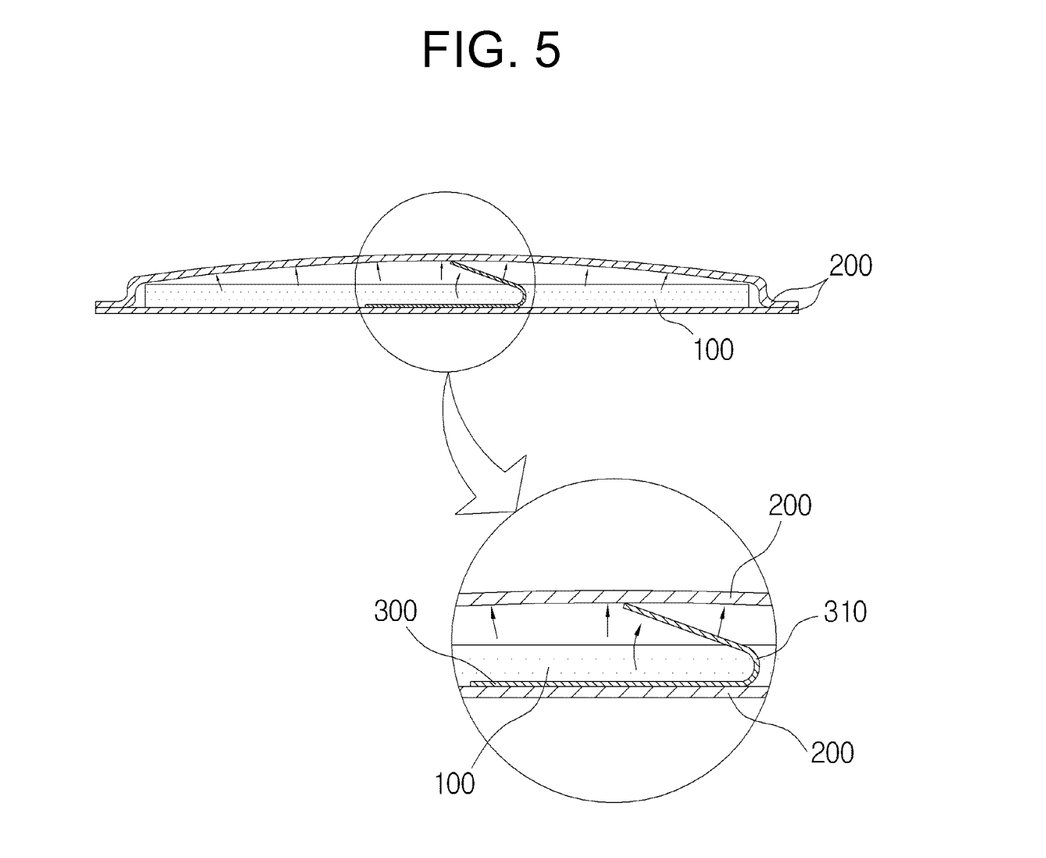
FIGS. 5 and 6 are cross-sectional views showing an operation principle of the shape memory alloy according to the exemplary embodiment of the present invention.

That is, in the secondary battery 1000 according to the exemplary embodiment of the present invention, in the case in which a finely short-circuited portion exists in the electrode body 130 of the battery cell 100 or a short-circuit is generated in a process in which the battery cell 100 is charged or discharged, a large amount of current flows, thereby instantaneously increasing a temperature in the battery cell 100 and generating a large amount of gas. Therefore, the pouch 200 is swelled as shown in FIG. 5.

Figure 6:
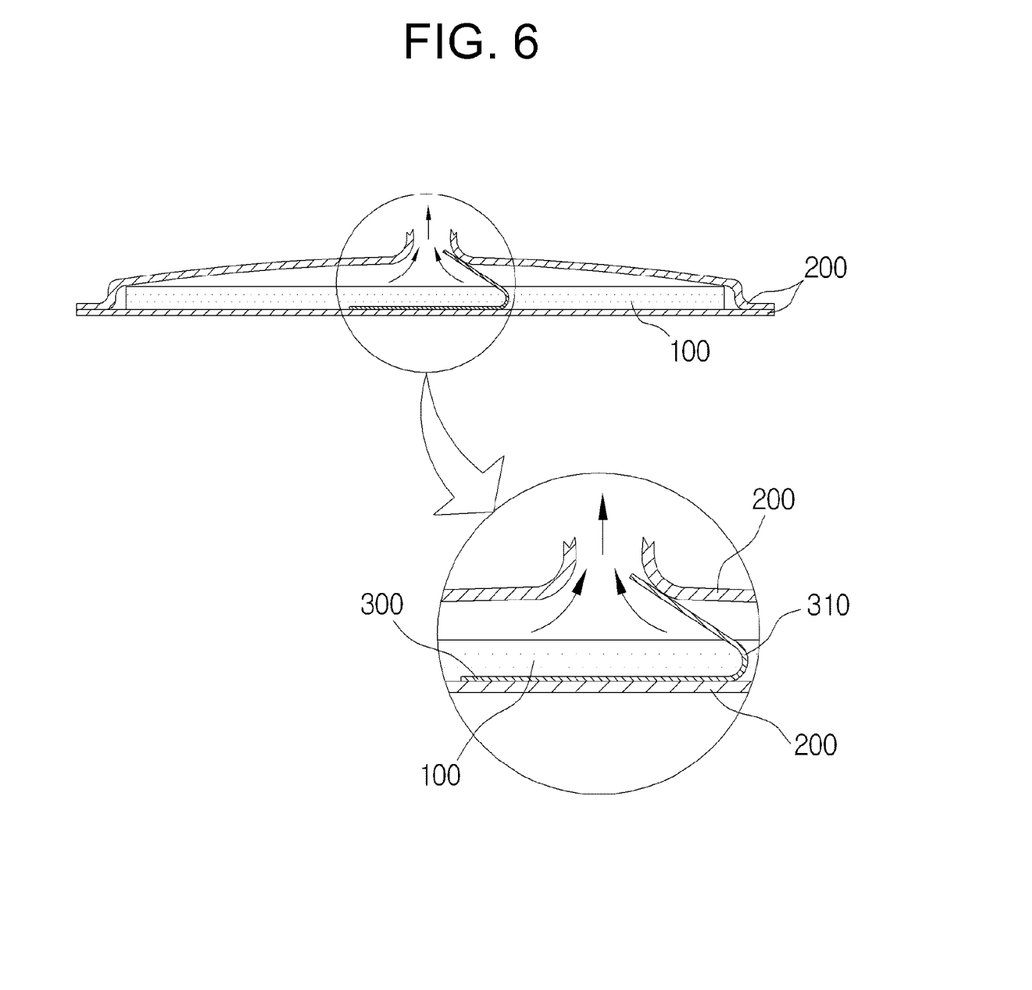

In this case, as shown in FIG. 6, the bent part 310 of the shape memory alloy 300 provided in the pouch 200 and positioned at one side of the electrode body 130 penetrates through and opens the pouch 200 while being unbent as a temperature increases.

Therefore, when the battery cell 100 is overheated at a specific temperature or more to generate the gas, the gas generated in the pouch 200 is discharged to the outside, thereby making it possible to reduce a risk of ignition and explosion.

As described above, since the secondary battery 1000 according to the exemplary embodiment of the present invention includes the bent shape memory alloy provided in the pouch, when the gas is generated in the pouch due to an increase in a temperature caused by overcharging, overdischarging, and the like, to expand the pouch, the bent part may penetrate through and open the pouch while being unbent. Therefore, the secondary battery 1000 according to the exemplary embodiment of the present invention may have a simple structure and be easily manufactured.

In addition, since the shape memory alloy 300 having the bent shape is provided in the pouch 200, even though the gas is generated to expand the pouch, heat is rapidly transferred, such that the pouch may be opened at an accurate temperature to discharge the gas.

Hereinafter, examples of each component of the secondary battery according to the exemplary embodiment of the present invention will be described.

First, the pouch 200 may be made of an aluminum laminate packing material.

The aluminum laminate packing material, which is a packing material manufactured in a thin and flexible shape by deposing a plastic thin film such as polyethylene (PE) on a thin aluminum (Al) film, may be easily sealed by heat fusion and easily opened due to a thin thickness.

Therefore, when the aluminum laminate packing material is used, the bent part 310 is unbent while a temperature of the shape memory alloy 300 increases, such that the pouch 200 made of the aluminum laminate packing material may be easily opened.

In addition, the shape memory alloy 300 may have a shape in which it is bent and folded in multiple stages.

Referring to FIG. 4, the shape memory alloy 300 is formed in a plate shape in which it has a long length, such that the bent part 310 may be formed in a round shape so that one side thereof is folded by 180 degrees. Alternatively, the shape memory alloy 300 is formed in a shape in which it is bent and folded in multiple stages, such that a plurality of bent parts 310 may be formed.

That is, in the case in which the shape memory alloy 300 is formed in a shape in which it is bent and folded in the multiple stages, when the gas is generated due to the increase in the temperature of the battery cell 100, the bent part of the shape memory alloy 300 becomes a C shape while being unbent to penetrate through and open the pouch 200, thereby making it possible to discharge the gas in the pouch 200.

In addition, the shape memory alloy 300 may be a nickel-titanium (Ti+Ni) alloy or a copper-zinc-aluminum (Cu+Zn+Al) alloy.

The shape memory alloy generally means an alloy having a property that even though it is deformed, it is returned to a shape before being deformed by heating. A nickel and titanium alloy alloyed to have a ratio of 1:1 is generally used. Alternatively, a copper-zinc (20 to 25%)-aluminum (4 to 6%) alloy may also be used.

When this shape memory alloy is restored to its original shape at a specific temperature, since it is restored by force about five times larger than force applied in order to deform the shape memory alloy, it may penetrate through and open the pouch 200 made of the aluminum laminate packing material.

In addition, the shape memory alloy 300 may be coupled to the pouch 200 so as to be positioned at an internal edge at which the pouch 200 is sealed.

When the gas is generated in the pouch 200 to expand the pouch 200, if the shape memory alloy 300 is coupled to the pouch 200 so as to be positioned at a central portion of the battery cell 100 corresponding to a portion at which the pouch 200 is maximally swelled, a size or a bent degree of the shape memory alloy 300 need to increase, such that it is difficult for the shape memory alloy 300 to penetrate through and open the pouch 200 and a manufacturing cost of the shape memory alloy 300 increases.

Therefore, the shape memory alloy 300 is coupled to the pouch 200 so as to be positioned at the internal edge at which the pouch 200 is sealed, thereby making it possible to decrease the size of the shape memory alloy 300 and easily open the pouch 200.

Here, the shape memory alloy 300 may be coupled to the pouch 200 so as to be positioned at the internal edge at which the pouch 200 is sealed and be coupled to the pouch 200 at the side at which the cathode tab 110 and the anode tab 120 of the battery cell 100 are formed.

The reason is that in the case in which the shape memory alloy 300 is mounted so that a portion at which the cathode tab 110 and the anode tab 120 are formed is directed upwardly, the gas may be rapidly discharged when the pouch 200 is opened to discharge the gas to the outside.

In addition, the shape memory alloy 300 may be formed in various shapes such as a shape in which both sides of the shape memory alloy 300 are folded, a shape in which the shape memory alloy 300 is folded in a wrinkle shape, in addition to the shape in which the shape memory alloy 300 is partially bent and folded or the shape in which the shape memory alloy 300 is bent and folded in the multiple stages, and be formed in any shape as long as the shape memory alloy 300 may penetrate through and open the pouch 200 when a temperature of the shape memory alloy 300 increases to a specific temperature.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. A secondary battery comprising:
   a battery cell having a cathode tab and an anode tab protrudedly formed at one side thereof;
   a pouch enclosing and sealing the battery cell so that the cathode tab and the anode tab of the battery cell are exposed to the outside; and
   a shape memory alloy provided in the pouch and formed in a plate shape in which a length thereof is longer than a width thereof with a bent part so that the shape memory alloy is partially bent,
   wherein the shape memory alloy is formed in such a manner that, on the basis of the bent part, one side thereof having a long length contacts one surface of the pouch and the other side thereof having a short length contacts the other surface of the pouch, so that an outer surface of the shape memory alloy folded contacts both inner surfaces of the pouch,
   wherein the bent part of the shape memory alloy penetrates through and opens the pouch while being unbent when a temperature of the battery cell increases to a specific temperature or more.

2. The secondary battery of claim 1, wherein the pouch is made of an aluminum laminate packing material.

3. The secondary battery of claim 1, wherein the shape memory alloy has a shape in which it is bent and folded in multiple stages.

4. The secondary battery of claim 1, wherein the shape memory alloy is a Ti+Ni alloy or a Cu+Zn+Al alloy.

5. The secondary battery of claim 1, wherein the shape memory alloy is positioned at an internal edge at which the pouch is sealed.

* * * * *